United States Patent [19]
Vogt
[11] 4,201,530
[45] May 6, 1980

[54] ARRANGEMENT FOR UNIFORM FILLING OF A MOLD CAVITY

[75] Inventor: Willy Vogt, Zürich, Switzerland
[73] Assignee: Bucher-Guyer AG., Zürich, Switzerland

[21] Appl. No.: 937,057
[22] Filed: Aug. 28, 1978
[30] Foreign Application Priority Data
Sep. 16, 1977 [DE] Fed. Rep. of Germany ....... 2741800
[51] Int. Cl.[2] .......................... B30B 11/02; B29C 3/00
[52] U.S. Cl. .................................... 425/260; 222/305; 425/257; 425/258; 425/261
[58] Field of Search ............... 425/260, 259, 258, 257, 425/261; 222/305, 306

[56] References Cited
U.S. PATENT DOCUMENTS

| | | | |
|---|---|---|---|
| 1,207,172 | 12/1916 | Johnson | 425/260 |
| 1,344,880 | 6/1920 | Goe | 425/260 |
| 2,511,332 | 6/1950 | Denison, Jr. | 425/260 |
| 3,970,223 | 7/1976 | Longinotti | 425/258 |

*Primary Examiner*—Donald J. Arnold
*Attorney, Agent, or Firm*—Ernest F. Marmorek

[57] ABSTRACT

An arrangement for filling an upwardly open cavity of a mold with bulk material includes a feeding receptacle which has an open bottom and is mounted for relative movement along the mold from a receiving position in which bulk material is introduced thereinto, towards a discharging position in which the bulk material is discharged from the feeding receptacle through its open bottom.

10 Claims, 5 Drawing Figures

ARRANGEMENT FOR UNIFORM FILLING OF A MOLD CAVITY

BACKGROUND OF THE INVENTION

The present invention relates to an arrangement for filling cavities of structures in general, and more particularly to an arrangement for filling bulk material into cavities of molds and the like.

There are various constructions of arrangements of this type already known and used. The present invention is concerned with an arrangement of this type which is particularly suited for filling cavities of molds provided in beds or platens of brick presses and the like. In this environment, it is already known to fill the respective cavity, which is upwardly open, by means of a filling receptacle which has an open bottom, and which is mounted for relative movement along the bed or platen in a given direction from a receiving position in which the bulk material is introduced into a feeding receptacle, towards a discharging position in which the open bottom of the feeding receptacle is juxtaposed with the open upper end of the respective cavity for discharge of the bulk material, into the respective cavity, and in which the walls of the feeding receptacle surround an open upper end of the respective cavity on all sides. A bottom wall may be movably mounted in the cavity, for vertical movement towards and away from the open upper end of the cavity.

Arrangements of this type are being used, in many instances, in connection with presses for refractory bricks. The requirements for the shape, accuracy, and quality of these refractory bricks are quite high. But the degree of filling of the mold cavity with ceramic material has a very substantial influence on the shape, accuracy, and quality of manufactured bricks.

In known brick presses of this type, the filled feeding receptacle is displaced from a filling position on the bed of the press over the cavity of the mold, while the bottom wall of the cavity of the mold is at the same elevation as the upper surface of the bed. The bottom wall of the cavity of the mold is constituted by a piston. Thereafter, the piston is lowered, so that the bulk or material to be compressed, in this case, a ceramic material, completely fills the cavity of the mold. At the same time, the feeding receptacle becomes empty. When this operation is terminated, the feeding receptacle is returned to the bed of the press. When this happens, the inner wall of the feeding receptacle which faces forwardly during the return displacement, compacts the ceramic material at, and during the movement over, the side of the cavity of the mold, which faces the same, to a higher degree than that obtained at the opposite side of the cavity during the sliding of the ceramic material into the cavity. This non-uniform compaction of the ceramic material in the cavity remains at least partially in existence during the following compressing operation, during which a further piston acts from above on the ceramic material, and it becomes apparent during the so-called breathing phase undergone by the compacted body, that the geometry of the compacted body, which is originally set by the shape of the cavity of the mold, changes.

Of course, it is conceivable to first let the feeding receptacle proceed further, after the filling of the cavity, in the original direction in which the feeding receptacle has been displaced from its discharging position, until the inner wall of the feeding receptacle which faces forwardly, as considered in the direction of displacement, is displaced beyond the side of the cavity which faces the same, so that a higher degree of compaction is first obtained there. Only thereafter can the return displacement of the feeding receptacle be commenced, so that a respectively higher degree of compaction is obtained at the sides of the cavity which are located opposite one another, as considered in the direction of displacement of the feeding receptacle. However, this alternate mode of operation would have the disadvantageous consequence of a considerable widening of the press at its side which is opposite the side at which the feeding receptacle is being filled. In addition thereto, if this procedure were resorted to, the ceramic material introduced into the cavity would be partially entrained for joint displacement by the outer wall of the feeding receptacle, and that could result, disregarding the possibility of soiling, in malfunctions of different kinds. Thus, any attempt at solving the above-mentioned problem of non-uniform degree of compaction in this manner is capable of only marginally improving the uniformity of compaction. The situation is not any different when the press platen includes a plurality of molds or cavities.

SUMMARY OF THE INVENTION

Accordingly, it is a general object of the present invention to avoid the disadvantages of the prior art.

More particularly, it is an object of the present invention to provide an arrangement for filling upwardly open cavities of molds and similar structures with bulk material, which does not suffer from any of the above-mentioned disadvantages of arrangements of this type known in the prior art.

Still another object of the present invention is to develop an arrangement of the above-mentioned type, which is capable of improving the uniformity of compaction of the material in a cavity of a mold.

A further object of the present invention is to design the arrangement so as not to substantially increase the amount of space assumed by the molding press and the feeding arrangement.

A concomittant object of the present invention is to develop an arrangement of the above-mentioned type which is simple in construction, inexpensive to manufacture and operate, and nevertheless reliable.

In pursuance of these objects and others which will become apparent hereafter, one feature of the present invention resides in an arrangement for filling upwardly open cavities of molds and similar structures with bulk material, which comprises a feeding receptacle having an open bottom bounded by a plurality of edges and mounted for relative movement along the respective structure in a predetermined direction from a receiving position, in which bulk material is introduced into a feeding receptacle, towards a discharging position, in which the open bottom of the feeding receptacle is juxtaposed with an open upper end of the respective cavity for discharging bulk material into the respective cavity, the open bottom having dimensions between leading and trailing edges, as considered in the above-mentioned direction, which exceeds the corresponding dimension of the cavity taken in the same direction; and at least one partition extending transversely of the direction, at least at the open bottom of the feeding receptacle, and being spaced from one of the leading and trailing edges by a distance at least equal to the corresponding dimension of the respective cavity. Advantageously, the open bottom of the feeding receptacle has a transverse dimension between two lateral edges, which at least equals that of the open upper end of the respective cavity. The arrangement advantageously further comprises a bottom wall of the structure mounted for vertical movement toward and away from the open upper end of the respective cavity, and cooperating with the feeding receptacle in a cyclical manner to fill the respective cavities.

Then, it is advantageous, when the bottom wall is located at the upper open end of the respective cavities, at least during a predominant part of the displacement of the feeding receptacle towards the discharging position thereof. A particularly advantageous aspect of the present invention resides in the fact that the above-mentioned distance is present between the parition and the trailing edge of the feeding receptacle.

The present invention is based on the idea that a higher degree of compaction can be achieved even at the side of the cavity of the mold which is closer to the filling position of the feeding receptacle, by using the feeding receptacle which is enlarged with respect to the opening of the cavity of the mold to a relatively small degree, and a suitable arrangement of the above-mentioned partition within the feeding receptacle, when the play between the feeding receptacle and the cavity of the mold is taken up in the direction of displacement towards discharge. Simultaneously therewith, the partition serves as a guide during the introduction of the bulk material into the cavity of the mold, so that a more uniform distribution of the bulk material in the cavity is achieved in this manner, too. The uniformity of the distribution can then be further enhanced by providing at least one additional partition, at least at the open bottom of the feeding receptacle, in accordance with a further facet of the present invention.

In order to avoid the possibility that the partition would entrain the above material already fed into the cavity, during the return displacement of the feeding receptacle toward its filling location, it is further proposed, in accordance with a further advantageous concept of the present invention, to compose the partition of an upper and a lower section, and to mount the lower section of the partition on the feeding receptacle for pivoting about an axis extending transversely of the above-mentioned direction. Then, it is further advantageous to provide means for maintaining the lower section of the partition in position against pivoting during displacement of the feeding receptacle towards the discharging position. Thus, the lower section of the partition can be made to yield during the return displacement of the feeding receptacle to be out of the way of the bulk material filled into the cavity, while the partition is to be considered as a rigid wall during the forward displacement of the feeding receptacle, the partition then assuring the desired degree of compaction at the corresponding side of the cavity.

In the event that the arrangement of the present invention is to be used in conjunction with a structure having a plurality of cavities, in accordance with the principle on which the present invention is based, and by using only a single feeding receptacle, the individual cavities of the multiple mold must be arranged behind one another, as considered in the above-mentioned direction, and at least one partition is required to be associated in the above-discussed manner with each individual cavity of the mold. This means, in the event that three individual cavities are arranged behind one another, that a partition which is associated with a first individual cavity as considered in the direction of displacement of the feeding receptacle towards its discharging position, is arranged at a distance from a wall of the feeding receptacle which faces in this direction, which is the same or larger than the length of the individual cavity in this direction, but smaller than the sum of this length and the length of the feeding receptacle in this direction, which exceeds the length of the multiple mold. Similarly, it is valid for the partition which is associated with the second individual cavity, that the distance from the trailing or rear wall of the feeding receptacle is the same or greater than the sum of the lengths of the first and second individual cavities, but smaller than the sum total of this sum and any excess length of the feeding receptacle. Finally, it is valid for the partition associated with the third individual cavity, that the distance from the rear wall of the feeding receptacle is greater than the sum of the lengths of the first, second, and third individual cavities. In this manner, it is assured, as is the case above, in conjunction with a single cavity, that the partition can respectively traverse the side of the individual cavity, which is close to the filling location of the feeding receptacle, while the rear wall of the feeding receptacle does not become juxtaposed with any one of the cavities.

Other features and advantages of the present invention will become more apparent from a consideration of the following detailed description, when taken in conjunction with the accompanying drawings.

DETAILED DESCRIPTION OF THE PREFERRED EMBODIMENTS

Figure 1:
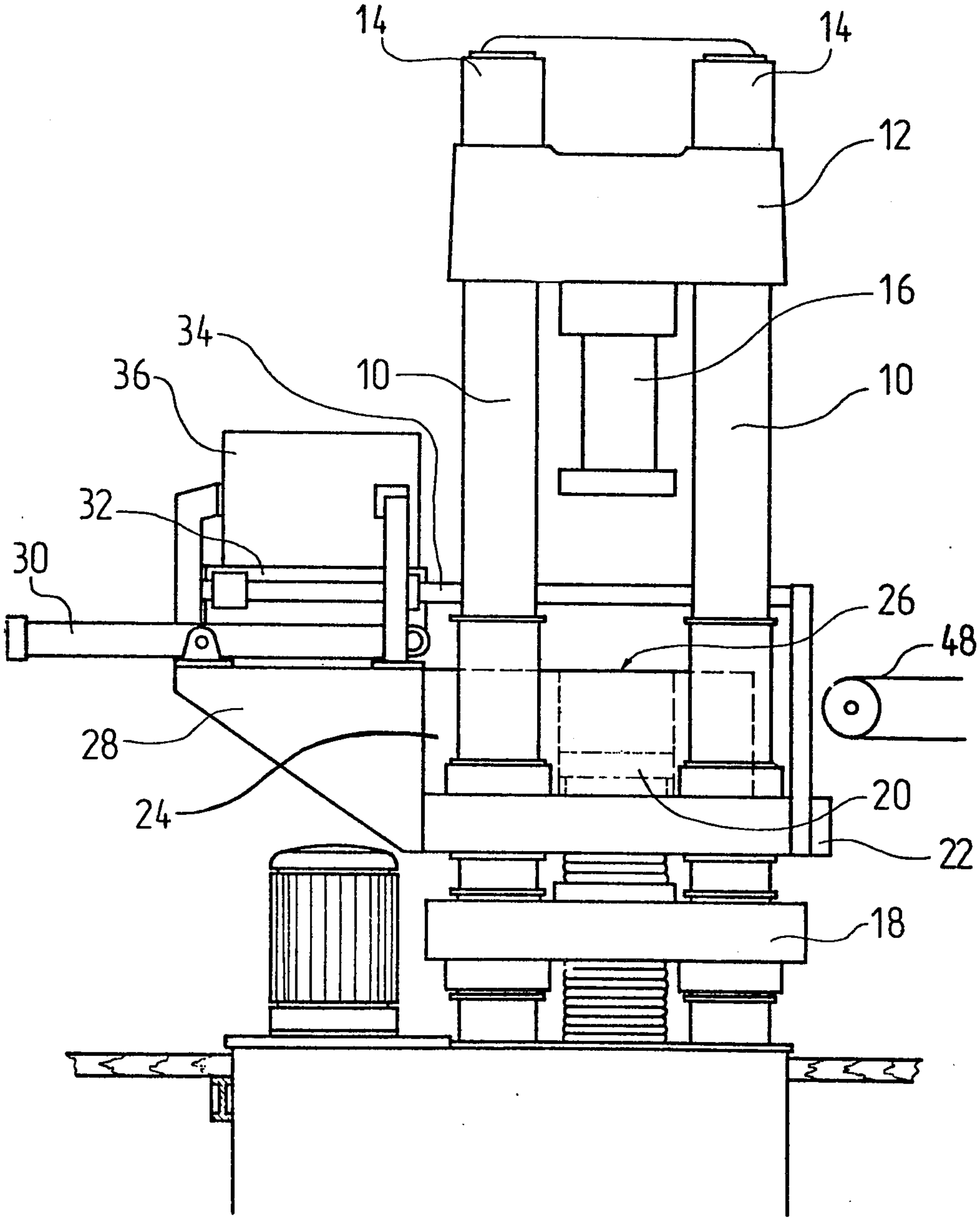
FIG. 1 is a side elevational view of a brick press equipped with an arrangement in accordance with the invention.

Considering now the drawings in detail, and first FIG. 1, thereof, it may be seen that it illustrates a hydraulically actuated four-column brick press. The press includes four columns 10 at the upper ends of which there is arranged a yoke 12, which is secured by nuts 14 to the columns 10, and thus prevented from sliding off during the pressing operation. A downwardly extending piston 16 is arranged in the center of the yoke 12, so as to be stationary relative thereto.

A pressing platen 18 is arranged at the lower ends of the columns 10, for longitudinal displacement along the columns 10. A piston 20 extends upwardly in the center of the pressing platen 18. A carrier 22 is arranged upwardly on the pressing platen 18, the carrier 22 being also slidable along the columns 10. A mold 24 is connected to the carrier 22. The mold 24 has a cavity 26, and the bottom wall of the cavity 26 is constituted by the piston 20. A support 28 is arranged next to the mold 24, outwardly of the space bounded by the columns 16. The support 28 is arranged on the carrier 22, and carries a hydraulic device 30, for displacing a feeding receptacle 32, which is open both upwardly and downwardly. The feeding receptacle 32 is guided by guide rods 34, during its displacement.

Furthermore, a filling hopper 36 for filling the above material into the feeding receptacle 32 is arranged on the support 28. In order to be able to fill the cavity 26, the mold 24 can be so aligned with respect to the support 28, that they together form a bed on which the feeding receptacle 32 is displaceable from the filling hopper 36 to the cavity 26.

Figure 2:
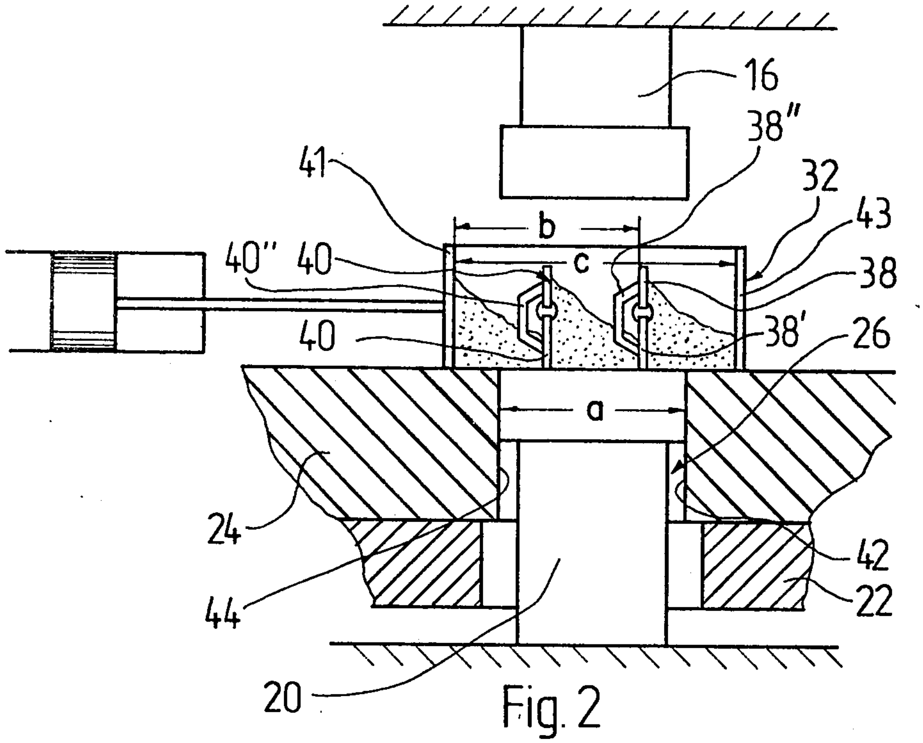
FIG. 2 is an axial sectional view through a part of the press of FIG. 1, prior to lowering of a bottom wall of the cavity.
Figure 3:
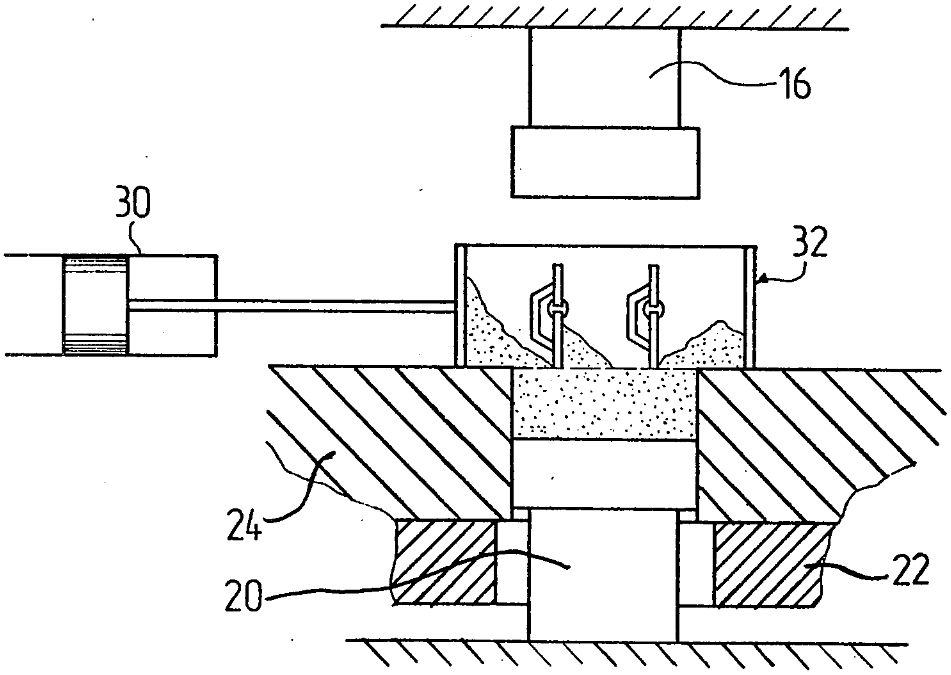
FIG. 3 is a view similar to FIG. 2, but following the lowering of the bottom wall.

Referring now particularly to FIGS. 2 and 3, it may be seen therein that the feeding receptacle 32 is constituted by a rectangular frame, in which there are arranged a first partition 38 extending transversely of the direction of displacement of the feeding receptacle 32, and a further partition 40. The lower edges of these partitions 38 and 40 extend all the way to the upper side of the above-mentioned bed. The frame of the feeding receptacle 32 is circumferentially larger than the cavity 26, so that it can assume a position in which it is located upwardly of the cavity 26, and surrounds the same completely from all sides. Especially, the length c of the feeding receptacle 32, in its direction of displacement, is greater than the length a of the cavity 26 in the same direction. The distance b of the first partition 38 from a wall 41 of the feeding receptacle 32, which is located rearwardly, as considered in the direction of displacement of the feeding receptacle towards its discharging position, is the same or greater than the length a of the cavity 26.

After the feeding receptacle 32 has been filled with the bulk or ceramic material by means of the filling cup 36, the hydraulic device 30 displaces the feeding receptacle 32 from the support 28 onto the mold 24, above the cavity 26. Under these circumstances, the mold 24 is situated at the same elevation as the support 28, and the bottom wall of the cavity 26, which is constituted by the piston 20, is moved up to the upper surface of the mold 24. When the bulk material is to be discharged from the feeding receptacle 32, the latter is brought into a position which is approximately illustrated in FIG. 2, where the above-mentioned partition 38 is still located ahead of a side 42 of the cavity 26, which faces the hydraulic device 30, while the feeding receptacle 32 completely surrounds the open upper end of the cavity 26 at the same time. Now, when the piston 20 is subsequently lowered, the feeding receptacle 32 discharges its contents into the cavity 26, which thus becomes gradually filled with the bulk or ceramic material. The partitions 38 and 40 serve as guides during the discharge of the ceramic material towards the cavity 26. Once the cavity 26 is filled with the ceramic material, the material feeding the receptacle 32 is displaced further to the right, as compared to the positions illustrated in FIGS. 2 and 3, until the rear wall 41 borders the cavity 26. Simultaneously therewith, the first partition 38 travels beyond the side 42 of the cavity 26, so that an increased degree of compaction is achieved at the region of the side 42 of the cavity 26. The lines of the same degree of compaction then extend approximately transversely from above to below, towards the side 42 of the cavity 26.

During the return displacement of the feeding receptacle 32, the lower inner edge of a wall 43, which is located frontwardly of the rear wall 41 of the feeding receptacle 32, and which inner edge faces towards the hydraulic device 30, will provide, in the same manner, for an increased degree of compaction at a side 44 of the cavity 26, which is located oppositely to the side 42, during the travel of the feeding receptacle 32 over the cavity 26. If the above-mentioned partition 38 were absent, a higher degree of compaction would only be achieved at the side 44 of the cavity 26.

A lower section 38', 40', of the respective partition 38 and 40 is pivotable during the return displacement of the feeding receptacle 32 of FIG. 2, in the backward direction, in a counter-clockwise manner, in order to avoid an entrainment and too pronounced compaction of the ceramic material filled in the cavity 26, at the side 44. However, the lower sections 38' and 40' are held in the illustrated positions thereof during the advancement of the feeding receptacle 32 in the rightward direction, against pivoting in a clockwise manner, by respective abutmens 38", and 40".

Figure 4:
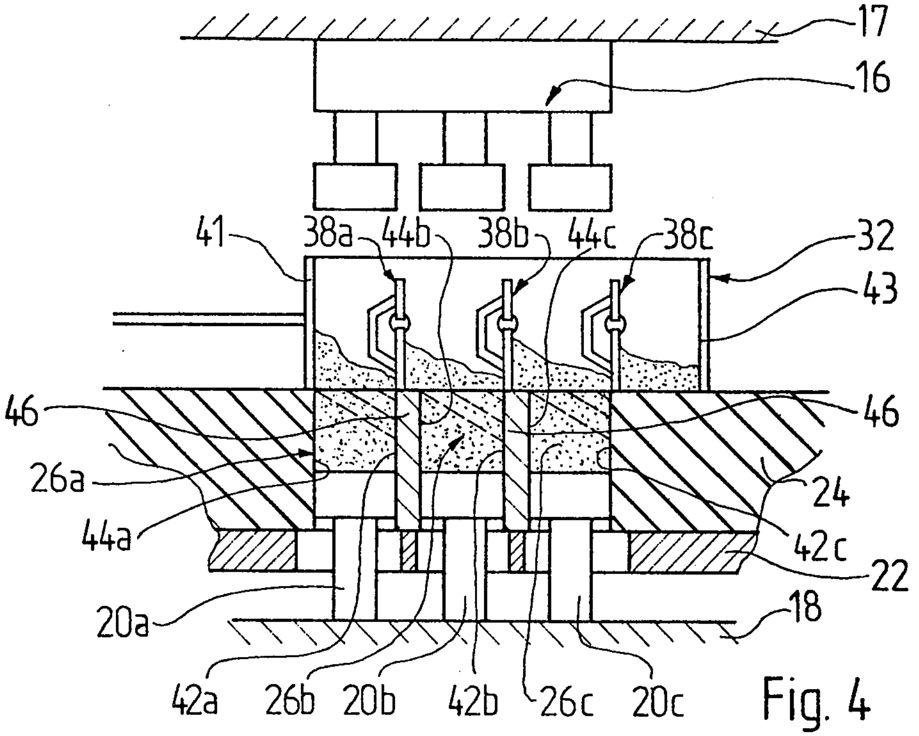
FIG. 4 is a view similar to FIG. 3, but illustrating a multiple mold.
Figure 5:
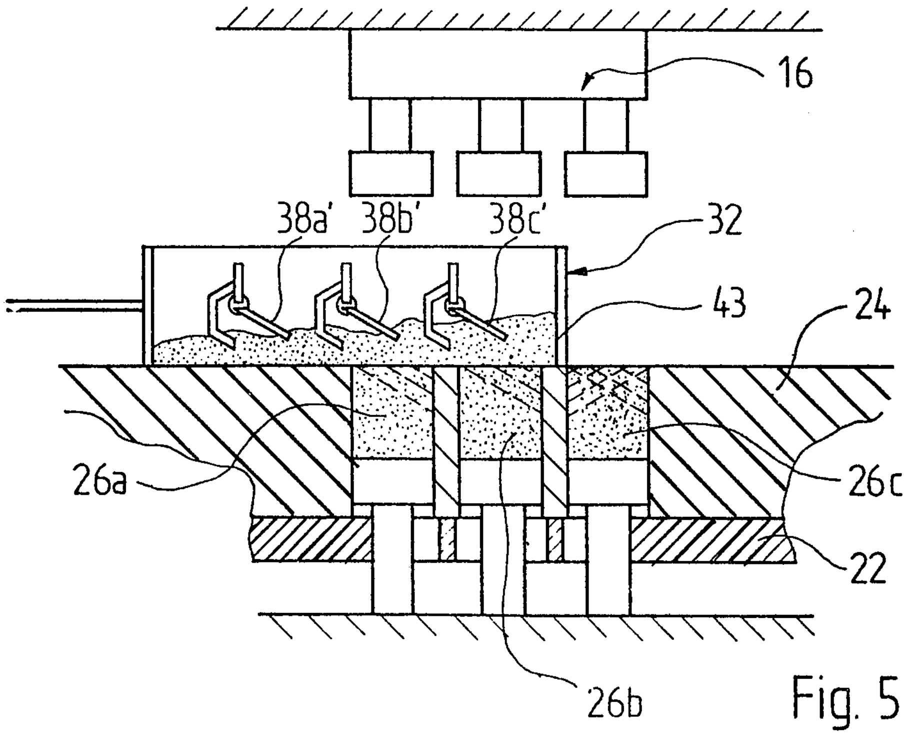
FIG. 5 is a view similar to FIG. 4, but illustrates the return movement of the feeding receptacle.

The conditions existing in connection with a multiple mold having a plurality of individual cavities 26*a*, 26*b*, and 26*c*, is illustrated in FIGS. 4 and 5. Pistons 20*a*, 20*b*, and 20*c*, are associated with each of the individual cavities of the molds 26*a*, 26*b*, and 26*c*, respectively, the pistons 20*a*, 20*b*, and 20*c* being jointly provided on the pressing platen 18. In a similar manner, the yoke 17 carries a piston 16 constituted by a plurality of individual pistons. The individual cavities 26*a*, 26*b*, and 26*c* are arranged behind one another, as considered in the direction of displacement of the feeding receptacle 32. The feeding receptacle 32 includes first partitions 38*a*, 38*b*, and 38*c*, which are associated with the individual cavities 26*a*, 26*b*, and 26*c*, respectively. When the thickness of the partitions 46 between the individual cavities 26*a*, 26*b*, and 26*c* is disregarded, then the partitions 38*a*, 38*b*, and 38*c* of the illustrated embodiment are arranged at the same distances from one another and with respect to the walls 41, and 43 of the feeding receptacle 32, as considered in the direction of its displacement. This distance is equal to the length of an individual cavity, which cavities all have the same length in this direction.

In order to discharge the ceramic material, the feeding receptacle 32, filled with the ceramic material, is so displaced on top of the multiple mold, that its front wall 43 is flush with the side 42*c* of the individual cavity 26*c*, which faces the hydraulic device 30. The first partition 28*a* then registers with the side 44*a* of the individual cavity 26, which faces in the opposite direction. The partitions 38*a* and 38*b* are then located upwardly of the partitioning walls 46. In this condition, the pressing platen 18 is moved downwardly, so that the feeding receptacle 32 and the individual cavities 26*a*, 26*b*, and 26*c* are filled. Thereafter, the feeding receptacle 32 is displaced towards the position illustrated in FIG. 4, in which its rear wall 41 is aligned with the side 44*a* of the individual cavity 26*a*. The partitions 38*a*, 38*b*, and 38*c* travel past the individual cavities 26*a*, 26*b*, and 26*c*, and cause an increase in the degree of compaction at the sides 42*a*, 42*b*, and 42*c* of the individual cavities 26*a*, 26*b*, and 26*c*, which face the hydraulic device 30. The direction of the wedge-shaped compaction zones obtained thereby is illustrated in FIG. 4, in broken lines.

In FIG. 5, there is illustrated a situation obtained when the feeding receptacle 32 moves in the return direction. The lower sections 38*a*', 38*b*', and 38*c*' of the partitions 38*a*, 38*b*, and 38*c* yield, when encountering the resistance of the ceramic material.

The front wall 43, which is located frontwardly as considered in the advancement direction of the feeding receptacle towards its discharging position travels, in succession, past the individual cavities 26*c*, 26*b*, and 26*a*, and produces a compaction on the opposite sides 44*c*, 44*b*, and 44*a* of the individual cavities 26*c*, 26*b*, and 26*a*. The shape of the compaction zones of generally wedge-shaped configurations, which results from the action of the wall 43 of the feeding receptacle 32, is illustrated for the individual mold 26*c*, also in broken lines, in FIG. 5.

When the cavity 26 or a respective corresponding cavity of a multiple mold is filled in the above-mentioned manner, and the feeding receptacle 32 is displaced back onto the support 28, the pressing operation proper is commenced. To this end, the pressing platen 18 with the piston 20, and the carrier 20 with the mold 24, are jointly displaced upwardly to such an extent that the upper piston 15 slightly penetrates into the cavity 26. The positioning is obtained by means of a limiting switch, which is of a conventional construction, and thus has been omitted from the drawing. Thereafter, the lower piston 20 is further pressed into the cavity 26, while the mold 24 is retained in its position, until a further limiting switch or pressure sensor terminates this phase of the pressing cooperation. For the removal of the pressed body, the mold 24 is moved downwardly, together with the piston 20. During this movement, the piston 20 is retarded or stopped, so that the pressed body is lifted out of the cavity 26. Non-illustrated conventional brick-gripping devices grip the pressed body and transport the same, with the aid of the shifting displacement of the feeding receptacle 32, onto a conveyor 48, which transports the pressed body towards a firing furnace.

While preferred embodiments of the invention have been shown and described herein, it will become obvious that numerous changes, additions, and omissions may be made to such embodiments, without departing from the spirit and scope of the present invention.

What is claimed is:

1. An arrangement for filling at least one upwardly open cavity of a mold with bulk material, the mold having a surface, comprising in combination:

a feeding receptacle having an open bottom bounded by a plurality of edges and mounted for relative sliding movement along a surface of said mold in a predetermined direction from a receiving position, in which bulk material is introducible into the feeding receptacle, toward a discharging position, in which said open bottom of said feeding receptacle is juxtaposed with an open upper end of said cavity for discharge of the bulk material into said cavity, said open upper end of said cavity being circumferentially surroundable by the edges of said feeding receptacle, said open bottom of said feeding receptacle having a prearranged dimension between a leading and a trailing edge as considered in said predetermined direction, which exceeds a corresponding predetermined dimension of the cavity taken in the same direction, said feeding receptacle having at least one partition extending transversely of said predetermined direction up to said surface, said partition being spaced from one of said edges by a distance at least equal to said corresponding predetermined dimension of said cavity.

2. An arrangement as defined in claim 1, and further comprising a bottom wall of the mold mounted for vertical movement toward and away from the open upper end of said cavity, and cooperating with said feeding receptacle in a cyclical manner to fill said cavity.

3. An arrangement as defined in claim 2, wherein said bottom wall is located at the open upper end of said cavity at least prior to the displacement of said feeding receptacle from said receiving position to said discharging position.

4. An arrangement as defined in claim 1, wherein said one of said edges is said trailing edge of said feeding receptacle.

5. An arrangement as defined in claim 1, further comprising at least one additional partition at least at said open bottom of said feeding receptacle.

6. An arrangement as defined in claim 1, wherein said partition includes an upper and a lower section, and further comprising means for mounting said lower section of said partition on said feeding receptacle for pivoting about an axis extending transversely of said predetermined direction.

7. An arrangement as defined in claim 6, further comprising means for maintaining said lower section of said partition in position against pivoting during the displacement of said feeding receptacle toward said discharging position.

8. An arrangement as defined in claim 1, wherein said mold has at least one additional cavity located downstream of the first cavity as considered in said predetermined direction, and additionally comprising a further partition substantially similar to the first partition of said additional cavity.

9. An arrangement for filling at least one upwardly open cavity of a mold with bulk material, the mold having a surface, comprising in combination:

a feeding receptacle having an open bottom bounded by a plurality of edges and mounted for relative sliding movement along a surface of said mold in a predetermined direction from a receiving position, in which bulk material is introducible into the feeding receptacle, toward a discharging position and vice-versa, said open bottom of said feeding receptacle being juxtaposed in said discharging position with an open upper end of said cavity for discharge of the bulk material into said cavity, said open upper end of said cavity being circumferentially surroundable by the edges of said feeding receptacle, said open bottom of said feeding receptacle having a prearranged dimension between a leading and a trailing edge as considered in said predetermined direction, which exceeds a corresponding predetermined dimension of the cavity taken in the same direction, said feeding receptacle having at least one partition extending transversely of said predetermined direction up to said surface, said partition being spaced from one of said edges by a distance at least equal to said corresponding predetermined dimension of said cavity, said partition serving as a guide during the discharge of the bulk material into said cavity, and aiding in compacting substantially uniformly the bulk material discharged into said cavity when said feeding receptacle is moved in said predetermined direction and in a direction opposite to said predetermined direction.

10. An arrangement for filling at least one upwardly open cavity of a mold with bulk material, the mold having a surface, comprising in combination:

a feeding receptacle having an open bottom bounded by a plurality of edges and mounted for relative sliding movement along a surface of said mold in a predetermined direction from a receiving position, in which bulk material is introducible into the feeding receptacle, toward a discharging position, in which said open bottom of said feeding receptacle is juxtaposed with an open upper end of said cavity for discharge of the bulk material into said cavity, said open upper end of said cavity being circumferentially surroundable by the edges of said feeding receptacle, said open bottom of said feeding receptacle having a prearranged dimension between a leading and a trailing edge as considered in said predetermined direction, which exceeds a corresponding predetermined dimension of the cavity taken in the same direction, said feeding receptacle having at least one partition extending transversely of said predetermined direction up to said surface, said partition being spaced from one of said edges by a distance at least equal to said corresponding predetermined dimension of said cavity, said partition including an upper and a lower section, and means for mounting said lower section of said partition on said feeding receptacle for pivoting about an axis extending transversely of said predetermined direction.

* * * * *